United States Patent [19]

Hitomi et al.

[11] Patent Number: 5,233,831
[45] Date of Patent: Aug. 10, 1993

[54] EXHAUST CONTROL SYSTEM FOR INTERNAL COMBUSTION ENGINE

[75] Inventors: Mitsuto Hitomi; Kenji Kashiyama, both of Hiroshima; Ken Umehara, Higashihiroshima, all of Japan

[73] Assignee: Mazda Motor Corporation, Hiroshima, Japan

[21] Appl. No.: 906,290

[22] Filed: Jun. 29, 1992

[30] Foreign Application Priority Data

Jun. 28, 1991 [JP] Japan ................... 3-159114
Jan. 31, 1992 [JP] Japan ................... 4-042114
Feb. 5, 1992 [JP] Japan ................... 4-054249

[51] Int. Cl.⁵ .................................. F01N 3/28
[52] U.S. Cl. ......................... 60/284; 60/292; 60/300; 123/90.15; 123/323; 123/339
[58] Field of Search ............... 60/284, 292, 300; 123/339, 323, 90.15

[56] References Cited

U.S. PATENT DOCUMENTS 2,906,253  9/1959  Nallinger ................... 123/339
3,503,716  3/1970  Berger ........................ 60/284
3,723,070  3/1973  Houdry ....................... 60/284

FOREIGN PATENT DOCUMENTS

62-667     1/1987  Japan .
1-159431   6/1989  Japan .
2-115537   4/1990  Japan .
2-256815  10/1990  Japan .

*Primary Examiner*—Douglas Hart
*Attorney, Agent, or Firm*—Keck, Mahin & Cate

[57] ABSTRACT

An exhaust control system has a first catalytic device disposed in an exhaust line and a second catalytic device, which is smaller in capacity than the first catalytic device, disposed in the exhaust line upstream from the first catalytic device. The system includes a shutter device disposed in the exhaust line upstream from the first catalytic device. The shutter device is caused, by a controller, to close the exhaust line during a predetermined period from a start of engine cranking, before an engine is warmed up, and open the exhaust line after the engine is warmed up, thereby promoting activation of the catalytic devices.

21 Claims, 9 Drawing Sheets

EXHAUST CONTROL SYSTEM FOR INTERNAL COMBUSTION ENGINE

BACKGROUND OF THE INVENTION

1. Field of the Invention

This invention relates to an exhaust control system having a catalytic device in an exhaust line for purifying exhaust gases.

2. Description of Related Art

In an internal combustion engine of an automotive vehicle, a catalytic device, such as a catalytic converter, is typically disposed in an exhaust passage for purifying exhaust gases discharged from the vehicle through the exhaust passage. It is desirable to promptly activate the catalytic device after the engine starts so that its inherent gas purifying function can be effectively performed. Therefore, the catalytic device is provided with a heater which receives electric power from an electric power supply of the vehicle and heats the catalytic device in order to promptly activate the catalyst of the catalytic device. In a vehicle equipped with an engine which has an exhaust system including such a catalytic device and a heater, a large amount of electric power is conventionally needed for the heater. Accordingly, a large battery having a large capacity must be installed in an engine compartment or the like. Such a large size battery may cause a shortage of space for various necessary elements which must be installed in the engine compartment.

In some engines of this kind, a primary catalytic device, disposed in the exhaust passage, and a secondary catalytic device, which has a smaller capacity than the primary catalytic device, disposed in the exhaust passage upstream from the primary catalytic device, are provided. When the engine cranks after it starts at a low temperature, the secondary catalytic device is initially heated by exhaust gas to its active temperature so as to purify the exhaust gas. The exhaust gas, purified and heated by the secondary catalytic device, is then led to the primary catalytic device, and promotes activation of the primary catalytic device. As a result, a time period before the primary catalytic device is heated and activated sufficiently to purify the exhaust gas is shortened. Such an engine and catalytic device arrangement is known from, for instance, Japanese Unexamined Patent Publication No. 2-256,815.

Even in an exhaust system which has a primary catalytic device and a secondary catalytic device which has a smaller capacity than the primary catalytic device and is disposed upstream from the primary catalytic device, exhaust gas is allowed to be discharged to the outside of the vehicle without being purified by both the secondary catalytic device and the primary catalytic device until the secondary catalytic device reaches its active temperature during warming up of the engine. Such a problem also occurs even in an exhaust system which has a heater for the primary catalytic device.

SUMMARY OF THE INVENTION

It is an object of the present invention to provide an exhaust control system for an internal combustion engine which promotes the activation of a catalytic device sufficiently to purify exhaust gases, even when the engine is operating at a low temperature.

It is another object of the present invention to provide an exhaust control for an internal combustion engine which eliminates harmful emissions in exhaust gas even before the activation of a catalytic device.

The foregoing objects of the present invention are accomplished by providing an exhaust control system for an internal combustion engine having a first catalytic device disposed in an exhaust passage, and a second catalytic device disposed in the exhaust passage upstream of the first catalytic device. The second catalytic device has a capacity smaller than that of the first catalytic device. The exhaust control system includes a shutter valve, disposed in the exhaust passage upstream of the first catalytic device, which is controlled to open and close the exhaust passage. When the engine is cranking at a temperature lower than a predetermined temperature, the shutter valve closes the exhaust passage during a predetermined specific period so as to hold exhaust gases in the exhaust passage and prevent the engine from stalling. This promotes the activation of the second catalytic device sufficiently so that it performs its inherent function. The exhaust gases passed through and heated by the second catalytic device promote the activation of the first catalytic device.

BRIEF DESCRIPTION OF THE DRAWINGS

The above and other objects and features of the present invention will be apparent to those skilled in the art from the following description of a preferred embodiment thereof when considered in conjunction with the drawings, in which.

DETAILED DESCRIPTION OF THE PREFERRED EMBODIMENT

Figure 1:
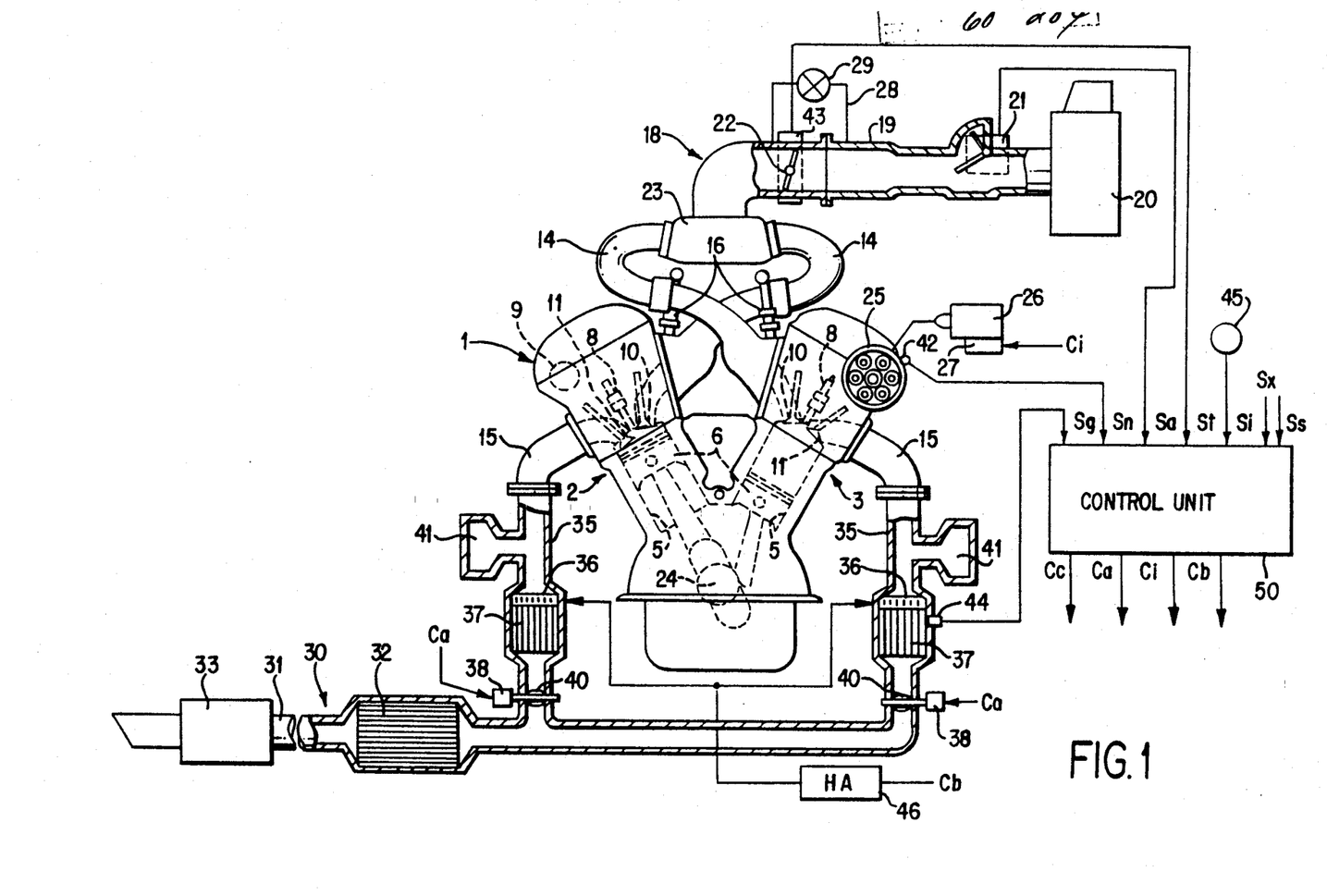
FIG. 1 is a schematic illustration showing an internal combustion engine with an exhaust system according to the preferred embodiment of the present invention.
Figure 4:
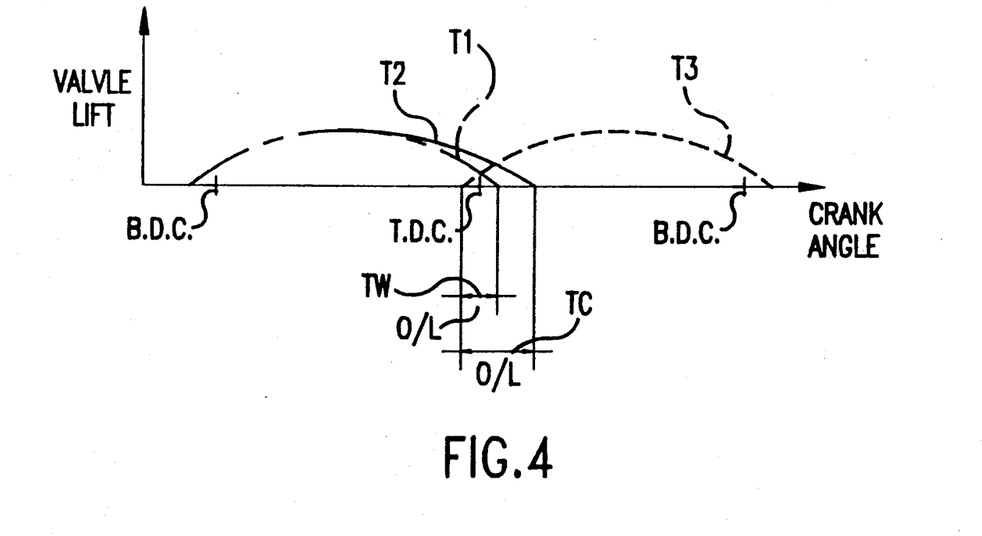
FIG. 4 is a diagram illustrating valve lifts of intake and exhaust valves.

Referring to the drawings in detail and, in particular, to FIG. 1, showing an exhaust control system according to a preferred embodiment of the present invention, an engine body 1 has first and second cylinder banks 2 and 3 arranged in a V-type formation and at a predetermined angle relative to each other. The first cylinder bank 2 is formed with a plurality of, for instance three, cylinders 5 arranged in a row. Similarly, the second of the cylinders 5 is represented by chained line for each of the first and second cylinder rows. A piston 6 is snugly received in each cylinder 5 so as to slide up and down. The engine body 1 is formed with a combustion chamber, which is provided with an ignition plug 8 above the piston 6. Further, the engine body 1 is formed with an individual intake passage 14 and an individual exhaust passage 15. The engine body is formed with two intake ports and two exhaust ports, opening into the combustion chamber of each cylinder, which are opened and closed at an appropriate timing by intake valves 10 and exhaust valves 11, respectively. The intake valve 10 is driven by an intake camshaft (not shown) in synchronism with rotation of an output shaft of the engine, such as an engine crankshaft. Similarly, the exhaust valve 11 is driven by an exhaust camshaft (not shown) in synchronism with rotation of the engine output shaft. The exhaust camshaft is associated with a variable valve timing mechanism 9 so that the exhaust valve 11 is driven at a first valve timing T1 or at a second valve timing T2, shown by a solid line and a broken line, respectively, in FIG. 4. The exhaust valve operation is retarded so that the exhaust port when operated at the second valve timing T2, is closed later than when operated at the first valve timing T1. The intake valve 10 is driven to open and close at a valve timing T3 as shown in FIG. 4. A first valve overlap (O/L) period TC is set to be longer when the exhaust valve 11 is operated at the second valve timing T2 than a second valve overlap (O/L) period TW when the exhaust valve 11 is operated at the first valve timing T1. The valve overlap period is that period in which the intake valve 10 and the exhaust valve 11 are simultaneously open.

A fuel injector 16 is disposed in an individual intake passage 14 so as to inject fuel into a respective cylinder through an individual intake passage 14. The individual intake passages 14 form a downstream portion of an intake system 18 of the engine. A common intake passage 19 forms an upstream portion of the intake system 18. The common intake passage 19 is provided, in order from its upstream end, with an air cleaner 20, an air flow sensor 21, a throttle valve 22 and a surge tank 23. The surge tank 23 is connected to upstream ends of the individual intake passages 14. The common intake passage 19 is provided with a bypass passage 28, having an idle speed control valve 29, which is well known in the art for controlling idle speed of the engine, so as to allow intake air to bypass the throttle valve 22.

The second cylinder bank 3 has a distributer 25 attached to it. The distributer 25 is electrically connected to the ignition plug 8 for each cylinder and is driven by the engine crankshaft 24. The fuel mixture supplied to the cylinder 5 is ignited and burned by an ignition system including the ignition plugs 8, the distributer 25, an ignition coil 26 electrically connected to the distributer 25, an ignition timing controller 27, and so forth. Burned gases produced in the combustion chambers are discharged into each individual exhaust passage 15.

Individual exhaust passages 15 are respectively connected to the cylinders 5 and form an upstream portion of an exhaust system 30. A downstream portion of the exhaust system 30 is formed by a common exhaust passage 31. A primary three-way catalytic device 32, such as a catalytic converter including rhodium, and a silencer 33 are disposed in the common exhaust passage 31. A pair of branched exhaust passages 35 are respectively connected to the plurality of the individual exhaust passages 15. A secondary three-way catalytic device 37, such as another catalytic converter including rhodium, and a shutter valve 40 are disposed in each branched exhaust passage 35. The secondary catalytic device 37 has a smaller capacity than that of the primary catalytic device 32 and is equipped with a heater 36 disposed upstream therefrom. The shutter valve 40, which is positioned downstream from the secondary catalytic device 32, is actuated by an electric actuator 38. An exhaust gas reservoir 41 having a large capacity is disposed upstream from each secondary catalytic device 37. Since the secondary catalytic device 37 disposed in the branched exhaust passage 35 has a relatively small capacity, it promptly reaches an active temperature due to exhaust gas produced during warming-up of the engine, even though the exhaust gas is at a low temperature after the engine starts. Therefore, during the warming-up of the engine, the secondary catalytic device 37 is activated first so as to perform exhaust gas purification. Then, the exhaust gas heated by the secondary catalytic device 37 is led to the primary catalytic device 32 so as to promote activation of the primary catalytic device 32.

Shutter valve 40 is controlled by the actuator 38 to close the branch exhaust passage 35 when the engine starts so as to cause exhaust gas to stagnate in the branched exhaust passage 35 upstream from the shutter valve 40. This promotes activation of the secondary catalytic device 37, due to an increase in temperature of the exhaust gas. Thereafter, when a predetermined specific period after the engine starts has passed, the actuator 38 causes the shutter valve 40 to open the branched exhaust passage 35 so as to discharge the exhaust gas through the branched exhaust passage 35 and the common exhaust passage 31. When the shutter valve 40 closes the exhaust passage, the exhaust gas passed through the individual exhaust passage 15 is introduced into the exhaust gas reservoir 41 having a large capacity. This prevents stalling of the engine a short time after the engine starts when the temperature of engine is still low. The predetermined specific period in which the shutter valve 40 is kept closed, after the engine starts and when the temperature of engine is still low, is a time period Tv necessary to activate sufficiently the secondary catalytic device 37 so that the engine does not stall. The time period Tv is set, for instance, between 5 and 10 seconds. The shutter valve 40 is opened when predetermined engine operating conditions, which will be described later, are present. The secondary catalytic device 37 is heated, by its associated heater 36, during the predetermined specific period after the shutter valve 40 has closed the branched exhaust passage 35. Activation of the secondary catalytic device, therefore, is promoted more quickly. When the shutter valve 40 closes the branched exhaust passage 35 during the time period Tv after the engine starts, the temperature of engine and, hence, of exhaust gas is still low. Consequently, the exhaust gas stagnates in the branched exhaust passage 35 disposed upstream from the shutter valve 40. Therefore, activation of the secondary catalytic device 37 is promoted more effectively after the engine starts when the temperature of the engine and, hence, of exhaust gas is still low, because of an increase in temperature of the exhaust gas. The shutter valve control mentioned above prevents exhaust gas from being purified by the secondary catalytic device 37 or by the primary catalytic device 32 and then discharged outside the vehicle through the exhaust system within the time period Tv. Such discharge is prevented until the secondary catalytic device 37 is activated sufficiently to purify the exhaust gas after the engine starts when the temperature of exhaust gas is still low.

Since the capacity of the secondary catalytic device 37 is smaller than that of the primary catalytic device 32, electric power needed by the heater 36 is small. In addition, a battery, forming part of the electric power system, is allowed to have a small capacity and, therefore, a small size. This helps to avoid a shortage of space from occurring in the engine compartment.

When combustibility of an air-fuel mixture in the engine is impaired in an engine operating condition in which the shutter valve 40 closes the branched exhaust passage 35 or when the vehicle is accelerating, the predetermined specific period for which the shutter valve 40 should be kept closed is altered. More particularly, the predetermined specific period is changed to a period from a time at which the engine starts when the temperature of exhaust gas is still low to a time at which impairment of combustibility of an air-fuel mixture in the engine occurs or at which the acceleration of the vehicle starts. In this manner, the shutter valve 40 is put into an open condition when impairment of the combustibility of the engine occurs or the acceleration of the vehicle starts. In this case, since the secondary catalytic device 37 becomes sufficiently active before or after the shutter valve 40 is opened, the exhaust gas is prevented from being discharged through the individual exhaust passage 15, the branch exhaust passage 35 and the common exhaust passage 31 before being purified by the secondary catalytic device 37 or the primary catalytic device 32.

Actuator 38 is disposed in the branched exhaust passage 35 and actuates the shutter valve 40. The actuator 38 is activated by an actuator control signal Ca from a control unit 50. The control unit 50 receives various signals, such as a air flow rate signal Sa from the air flow sensor 21, an engine speed signal Sn from an engine speed sensor 42 disposed at the distributer 25, a throttle opening signal St from a throttle sensor 43, a temperature signal Sg, indicative of the temperature of the secondary catalytic device 37, from a temperature sensor 44 associated with one of the two secondary catalytic devices 37, an ignition signal Si from an ignition key switch 45, and an engine operating condition signal Sx, indicative of operating conditions of the engine which include the temperature of cooling water and the like. Based on these signals, the control unit 50 controls the actuators 38 to actuate the shutter valves 40, the heaters 36 for the secondary catalytic devices 37, the variable valve timing mechanism 9 for changing the valve timing of the exhaust valves 11 and the idle speed control valve 29 for adjusting idling speed of the engine. The control unit 50 also controls ignition timing of the engine. Each of these sensors may be of any well known type.

In the control of the actuator 38 by the control unit 50, when the ignition key switch 45 provides an ignition signal Si, indicating engine cranking, a temperature signal Sg from the temperature sensor 44 indicates that a temperature Tc of the secondary catalytic device 37 is still below an active temperature Tco. Then, when the engine starts and the exhaust gas temperature is still low, the control unit 50 provides an actuator control signal Ca tc each actuator 38 so as to cause the shutter valve 40 to close the branched exhaust passage 35. The duration of the time period Tv is set at a time between, for instance, 5 and 10 seconds. For the duration of this time period Tv from a time at which the ignition signal Si is provided, the control unit 50 interrupts the actuator control signal Ca to the actuator 38 so as to cause the shutter valves 40 to open the branched exhaust passage 35. However, even if the time period Th has not elapsed, the control unit 50 interrupts the actuator control signal Ca so as to also open the branched exhaust passage 35 when an engine speed signal Sn is received from the engine speed sensor 42 representing change $\Delta N$ in engine speed N less than a predetermined minus value $-A$. This indicates a sudden reduction in engine speed N due to an impairment in combustibility of an air-fuel mixture in the engine or receiving a throttle opening signal St from the throttle opening sensor 43 representative of a change in throttle opening Th of the throttle valve 22 greater than a predetermined plus value A. Such a change in the throttle opening Th indicates that the engine or vehicle has been put under acceleration. This control of the shutter valve 40 is performed after a period, defined between a time the ignition signal Si is provided and a time at which combustibility of the engine is impaired or vehicle acceleration occurs, has elapsed. This period is substituted for the predetermined specific period.

In addition to the actuator control signal Ca, the control unit 50 provides a heater driver 46 for the heaters 36 with a heater control signal Cb. The heater control signal Cb is maintained until a time period Th has elapsed. The time period Th may, for instance be more than ten seconds, and follows a time period Ts necessary for the engine to crank up from the provision of an ignition signal Si from the ignition key switch 45. The time period Th is longer than the time period Tv established for keeping the shutter valve 40 closed after an engine ignition at a low temperature. In the presence of the heater control signal Cb, the heater driver 46 supplies an electric power to each heater 36 so as to heat the corresponding secondary catalytic device 37. In this control, the control unit 50 controls the heater driver 46 to begin the supply of electric power to both the heaters 36 once the time period Ts necessary for the engine to crank up after the provision of the ignition signal Si has elapsed. This prevents coincidental supply of electric power to the engine and the heater driver 46, thereby reducing the load on an electric power system for an engine starter.

Control unit 50 controls an ignition timing for the engine by a normal ignition control when the shutter valves 40 open the branched exhaust passages 35 and by a warming-up ignition control when the shutter valves 40 close the branched exhaust passages 35. In the normal ignition control, a standard advance angle is obtained based on an engine speed N, represented by an engine speed signal Sn, and a quantity Q of intake air, represented by an air flow rate signal Sa. The standard advance angle is subjected to an advancing correction or a retarding correction based on the temperature of cooling water, represented by a temperature signal Sx. After this correction, the advance angle is used as a substantial advance angle. Then, an ignition control signal Ci, corresponding to the substantial advance angle, is generated and sent to the ignition timing controller 27. The ignition timing controller 27 cuts off a primary current in the primary coil of the ignition coil 26 at a timing determined by the ignition control signal Ci. Consequently, a high pulse voltage generated at a secondary coil of the ignition coil 26 is distributed to the ignition plugs 8 through the distributer 25 in a predetermined order. This voltage sparks the ignition plugs 8 at timings determined by the ignition control signal Ci.

During the warming-up ignition control, the standard advance angle is computed based on the engine speed signal Sn. The temperature signal Sa is subjected to a retard correction with a predetermined value of retardation, which is an angle between 10 and 20 degrees from a top dead center position of the piston in a compression stroke. An ignition control signal Ci, corresponding to a substantial advance angle thus obtained, is provided and sent to the ignition timing controller 27 so as to spark the ignition plug 8 at an ignition timing determined by the ignition control signal Ci. When the shutter valve 40 closes the branched exhaust passage 35, the temperature of exhaust gas is increased, even when the engine operates at low speeds. The secondary catalytic device 37, therefore, is activated in a short period. During this control, an engine stall should surely be avoided.

Further, the control unit 50 manages valve overlap control and idle speed control. The control unit 50 provides a valve timing control signal Cc to the variable valve timing mechanism 9 so as to change a valve overlap (O/L) between the intake valve 10 and the exhaust valve 11. The valve overlap is changed to the second valve overlap time T2 from the first valve timing T1 as shown in FIG. 4.

Figure 5:
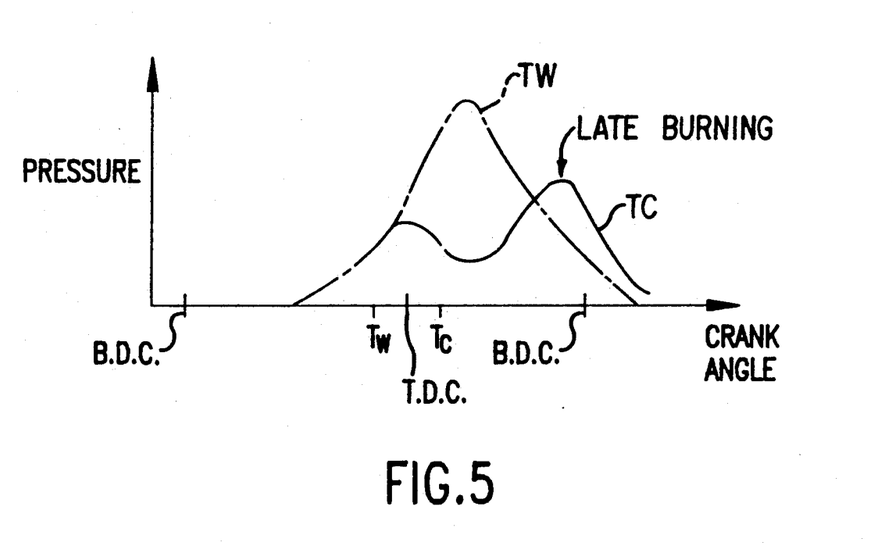
FIG. 5 is a diagram representing exhaust pressure in a combustion chamber of the engine.

When the engine temperature is still low, the control unit 50 controls the idle speed control valve 29 so that it opens wide and increases a rate of fuel injection in order to compensate for increased work required of the engine for discharging exhaust gases together with closing the shutter valve 40. As shown in FIG. 5, when the control unit 50 operates to extend the valve overlap period after the engine starts at a low temperature, combustion in the combustion chamber becomes slow, due to an increase of "reprimarying" gas in the combustion chamber in accordance with extension of the overlap period. In such a combustion condition, combustion occurs at a later half period of the extension stroke. At the same time, carburetion of fuel is also promoted due to an increase of reprimarying gas in the combustion chamber in accordance with extension of the overlap period.

By this control, the temperature of the gas exhausted from the engine becomes high. As a result, the secondary and primary three-way catalytic devices are activated in a short time period. Because these catalytic devices are activated in a only short period, purification of exhaust gas starts quickly.

Figure 6:
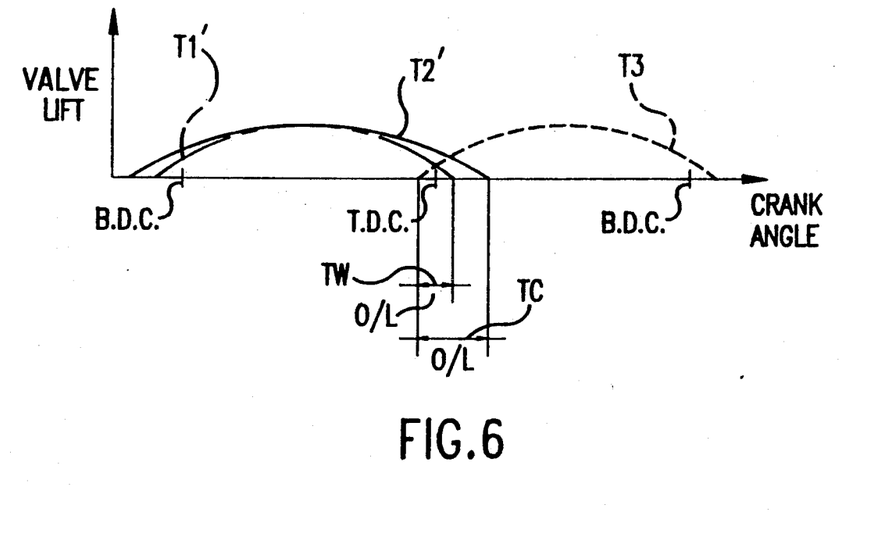
FIG. 6 is a diagram illustrating valve lifts of the intake and exhaust valves for a varied valve timing.

Referring to FIG. 6, a variation of overlap period of the exhaust valve 11 and the intake valve 10 is shown. The exhaust valve opens earlier at a second valve time T2' than at a first valve timing T1' so that exhaust gas at a high temperature in an extension stroke of the engine is passed to the exhaust passage 30. As a result, the temperature of the secondary three-way catalytic device is elevated in a shorter period by the high temperature exhaust gas.

Figure 2:
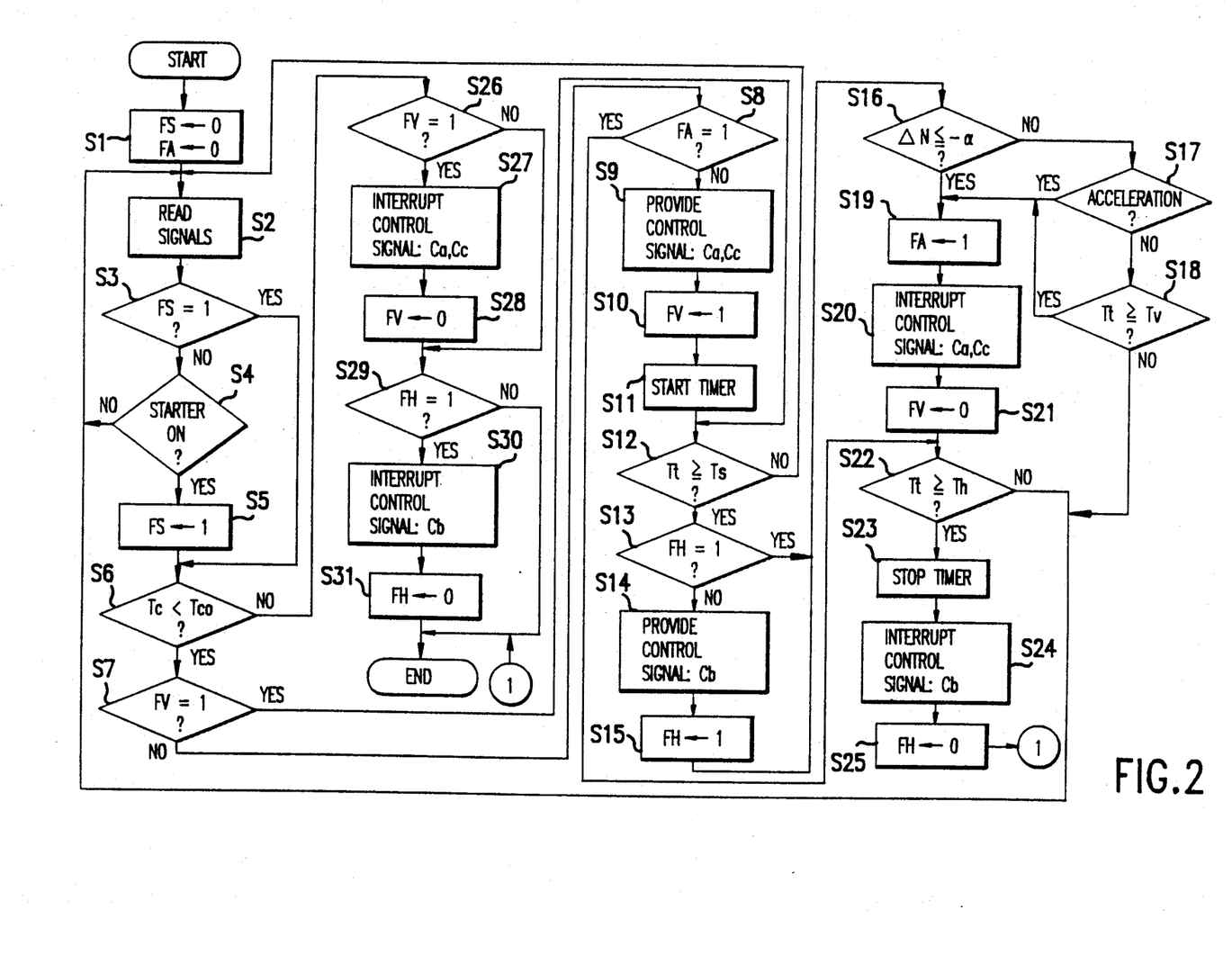
FIG. 2 is a flow chart illustrating an exhaust control routine for a microcomputer of an exhaust control unit.
Figure 3:
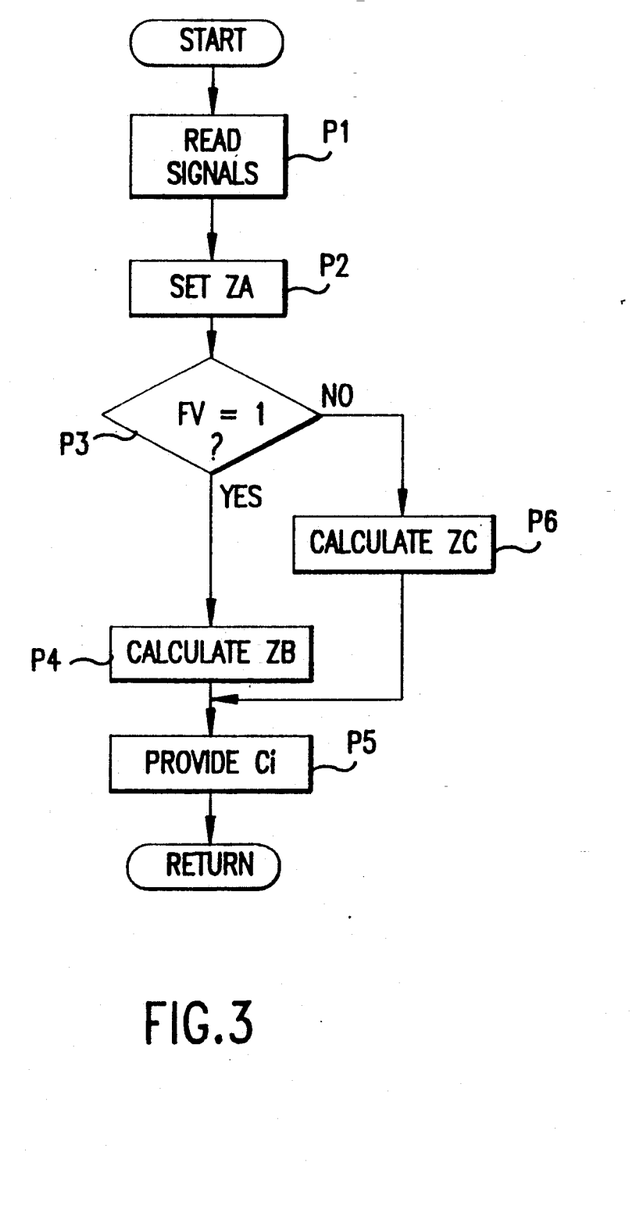
FIG. 3 is a flow chart illustrating an ignition timing control routine for the microcomputer.

The operation of the exhaust system shown in FIG. 1 is best understood by reviewing FIGS. 2 and 3, which are flow charts illustrating a main routine and a subroutine for a microcomputer of the control unit 50. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Referring to FIG. 2, which is a flow chart of the exhaust system control routine, four flags, such as an ignition flag FS, a shutter flag FS, a heater flag FH and an acceleration flag FA, are used. The ignition flag FS is set to a state of "1," which indicates that the ignition key switch 45 is turned on, or to a state of "0," which indicates that the ignition key switch 45 is turned off. The shutter flag FV is set to a state of "1," which indicates that the shutter valve 40 closes the branched exhaust passage 35, or to a state of "0," which indicates that the shutter valve 40 opens the branched exhaust passage 35. The heater flag FH is set to a state of "1," which indicates that the heaters 36 are activated, or to a state of "0," which indicates that the heaters 36 are inactive. The acceleration flag FA is set to a state of "1," which indicates that the engine is under acceleration, or to a state of "0," which indicates that the engine is not under acceleration.

After initializing or resetting the ignition flag FS and the acceleration flag FA to their initial states of "0" at step S1, various necessary signals Si, Sg, etc., are read at step S2. Then, a decision is made st step S3 as to whether or not the ignition flag FS has been set to "1." If the answer is "NO," another decision is made at step S4 as to whether or not an ignition signal Si is provided. The ignition signal indicates that the ignition key switch 45 is turned on to start the engine or that the engine starter is actuated to start engine cranking. When an ignition switch Si is detected, after setting the ignition flag FS to "1" at step S5, the sequence proceeds to step S6. If the answer to the decision made at step 63 is "YES," the sequence proceeds directly to step S6. On the other hand, if the decision made at step S4 is "NO," then, the signals are renewed at step S2.

At step S6, a decision is made as to whether or not the temperature of the secondary catalytic device Tc, represented by the temperature signal Sg, is below the active temperature Tco. If the answer to this decision is "YES," the secondary three-way catalytic device 37 is not yet sufficiently activated. Then, a decision is made at step S7 as to whether or not the shutter flag FV has been set to the state of "1" and, if the answer is "NO," a decision is subsequently made at step S8 as to whether or not the acceleration flag FA has been set to the state of "1." If both of answers to the decisions made steps S7 and step S8 are "NO," an actuator control signal Ca and a valve timing control signal Cc are provided at step S8 to the actuator 38 and the variable valve timing mechanism 9, respectively, at step 9. As long as the actuator control signal Ca is continuously provided, the shutter valve 40 is kept opened. Simultaneously, as long as the valve timing control signal Cc is continuously provided, the variable valve timing mechanism 9 extends the valve overlap period (O/L) from the period TW to the period TC and maintains the period TC as shown in FIG. 4. Then, after setting the shutter flag FV to "1" at step S10, a timer is actuated to start counting of time at step S11. After actuating the time at step S11 or, if the answer to the decision concerning the shutter flag FV made at step S7 is "YES," a decision is made at step S12 as to whether or not a time Tt counted by the timer is greater than the time period Ts, which is defined as a period from a time at which the engine is started by the starter to a timing at which the engine finishes cranking up. When the answer to the decision made at step S12 is "NO," the routine orders return to step S2. Otherwise, when the timer counts up a time Tt equal to the time period Ts, a decision is made at step S13 as to whether or not the heater flag FH has been set to "1." When the answer to the decision made in step S13 is "NO," a heater control signal Cb is provided to the heater actuator 46, electrically connected to the heaters 36, at step S14 so as to activate the heaters 36 and the heater flag FH is set to "1" at step S15. After setting the heater flag FH to "1" at step S15, or directly, when the heater flag FH has been set to "1" at step S13, a decision is made at step S16 as to whether or not a speed change $\Delta N$ of engine speed, represented by an engine speed signal Sn, is less than the predetermined minus value $-A$. This decision is made in order to determine if an abrupt reduction in engine speed N is present, due to deterioration in combustibility of the engine. When the speed change $\Delta N$ of engine speed is beyond the predetermined minus value $-A$, a decision is made at step S17 as to whether or not the engine is put into an acceleration condition. This decision is made based either on a change in opening $\Delta Th$ of the throttle valve 22, obtained from a throttle opening signal St, or on a determination that the brake is released while the automatic transmission is in a drive range. If the change in opening $\Delta Th$ of the throttle valve 22 is equal to or greater than the predetermined plus value A or when the brake is determined to have been actually released and the automatic transmission is in the drive range, the answer to the decision made at step S17 is "YES." If the answer to the decision made at step S17 is "NO," a decision is made at step S18 as to whether or not a time Tt counted out by the timer is equal to or greater than a predetermined time Tv from the moment an ignition signal Si is provided by an operation of the ignition key switch 45. If the answer to the decision made at step S18 is "NO," then the sequence orders a return to step S2.

When the answer is "YES" at step S16, at step S17 or at step S18, after setting the actuator flag FA to "1" at step S19, the actuator control signal Ca and the valve timing control signal Cc are interrupted at step S20 so as to cause the shutter valve 40 to open and the variable valve timing mechanism 9 to change the valve timing to the first valve timing T1. Then, after setting the valve flag FV to "0" at step S21, a decision is made at step S22 as to whether or not a time Tt counted out by the timer is equal to or greater than the predetermined time period Tv. This decision is also made when the answer to the decision made at step S8 is "YES." When the time Tt is less than the predetermined time period Tv, the sequence orders a return to step S2. Otherwise, if the timer counts up a time Tt greater than the predetermined time Tv, after stopping the timer at step S23, the heater control signal Cb is interrupted at step S24 so as to deactivate the heaters 36. Then, after setting the heater flag FH to "0" at step S25, the sequence ends.

If the answer to the decision concerning the active temperature Tco of the secondary catalytic device made at step S6 is "NO," this indicates that the temperature Tc of the secondary catalytic device 37 is equal to or greater than the active temperature Tco. Then, a decision is made at step S26 as to the condition of the actuator flag FA. When the shutter flag FV has been set to "1," the actuator control signal Ca and the valve timing control signal Cc are interrupted at step S27 so as to deactuate actuator 36 and the variable valve timing control mechanism 9. After setting the shutter flag FV to "0" at step S28 or if it is determined that the shutter flag FV has not been set to "1" at step S26, a decision is made at step S29 as to whether or not the heater flag FH has been set to "1." When the heater flag FH has been set to "1," a heater control signal Cb is interrupted so as to deactuate the heater actuator 46, thereby terminating heating by the heaters 36 at step S30. After setting the heater flag FH to "0" at step S31, or if the answer to the decision made at step S29 is "NO," the sequence ends.

Referring to FIG. 3, which is a flow chart of the ignition timing control routine, after reading various signals at step P1, a standard advance in ignition timing ZA is established, based on an engine speed signal Sn and an air flow rate signal Sa, at step P2. Then, a decision is made at step P3 as to whether or not the shutter flag FV has been set to "1," which indicates that the shutter valve 40 is closed. When it is determined at step P3 that the shutter flag Fv has been set to "1," i.e., the answer to the decision made at step P3 is "YES," a substantial advance ZB in the ignition timing is calculated by correcting the standard advance ZA with a predetermined correction factor at step P4. At step P5, an ignition control signal Ci is produced by the ignition timing controller 27 according to the substantial advance ZB in ignition timing when the shutter valve 40 is closed or the standard advance ZA in ignition timing when the shutter valve 40 is opened.

Although the shutter valve 40 for opening and closing each branch exhaust passage 35 is disclosed as being disposed in the branched exhaust passage 35 downstream from the secondary catalytic device 37, this valve may be disposed between the secondary three-way catalytic device 37 and the exhaust gas reservoir 41 in one of the branch exhaust passages 35, as long as each of the secondary three-way catalytic device 37 is associated with a heater 36. The exhaust gas reservoir 41 may be formed as a resonance chamber having a particular volume so as to respond to a specific frequency, thereby achieving an optimum resonance effect and reducing exhaust noises.

For more effective emission control during warming up of the engine, the valve overlap period is desirably controlled according to ranges of engine operating conditions previously prepared in the form of a map.

Figure 7:
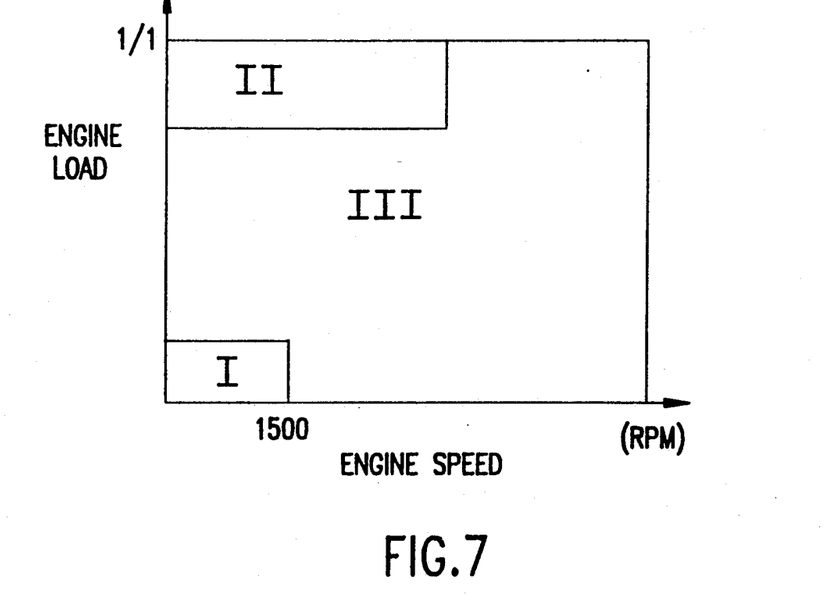
FIG. 7 is a diagram illustrating various ranges of engine operating conditions.

Referring to FIG. 7, which shows a map of ranges of engine operating conditions defined in terms of engine speed and engine load, there are provided three ranges of engine operating conditions, such as a range I, in which the engine is subjected to low load and operates at low speeds, a range II, in which the engine is subjected to high load and operates at low speeds, and a range III, which is a range other than the ranges I and II. The ranges I, II and III have the following properties:

(1) Range I:

A valve timing is changed between periods during and after warming up of the engine. The valve timing is set to the timing T1 so that the first valve overlap period TW is achieved once the engine has warmed up, and is changed to the timing T2 so that the second valve overlap period TC, which is longer than the first valve overlap period TW, is achieved while the engine has not yet warmed up.

(2) Range II:

A valve timing is set to the first timing T1 so that the valve overlap period TW is achieved for high charging efficiency.

(3) Range III:

A valve timing is set to the second valve timing T2 so that the second valve overlap period TC is achieved.

This is done in an attempt to improve gas mileage and reduce emissions of nitrogen oxides caused by an increase in internal exhaust gas recirculation (EGR) at low and middle engine loads and also in order to improve scavenging efficiency of exhaust gases so as to raise engine output at high engine loads. Ignition takes place at a time Tw, represented by a crank angle, before a top dead center position TDC when the engine has warmed up, and at a time Tc, also represented by a crank angle, after the top dead center position TDC when the engine has not yet warmed up. Such is shown in FIG. 5.

In the range I, the short valve overlap period TW is achieved and the shutter valve 40 is opened after the engine has warmed up. Also, the long valve overlap period TC is achieved, the shutter valve 40 is throttled, and an ignition timing before and during engine warming up is retarded. Accordingly, after the engine has warmed up, high combustibility of the air and fuel mixture by the engine is stably obtained with a short valve overlap period. Also, both before and during warming up of the engine, an increase in the rate at which intake air is admitted into the engine and, hence, an increase in the quantity of fuel admitted into the engine are achieved due to an increased opening of the idle speed control valve 28 so as to compensate for an increased discharging load of the engine resulting from throttling of the shutter valve 40. Both before and during warming up of the engine, burning of fuel becomes somewhat sluggish due to an increase in residual gases which results from changing the valve overlap period so that it is longer. Also, late burning is induced so that fuel burns late in an expansion stroke due to a retarded ignition timing as shown in FIG. 5.

An increase in residual gases, caused by changing the valve overlap period so that it is relatively long, promotes fuel vaporization or atomization. Before and during warming up of the engine, when engine operating conditions are in the range I, exhaust gases are discharged at a high temperature through exhaust ports, so as to heat both the cylinder head and cooling water circulating through the cylinder head, thereby enhancing warming up of the engine. Moreover, high temperature exhaust gases accelerate activation of the catalytic devices 32 and 37.

Figure 8:
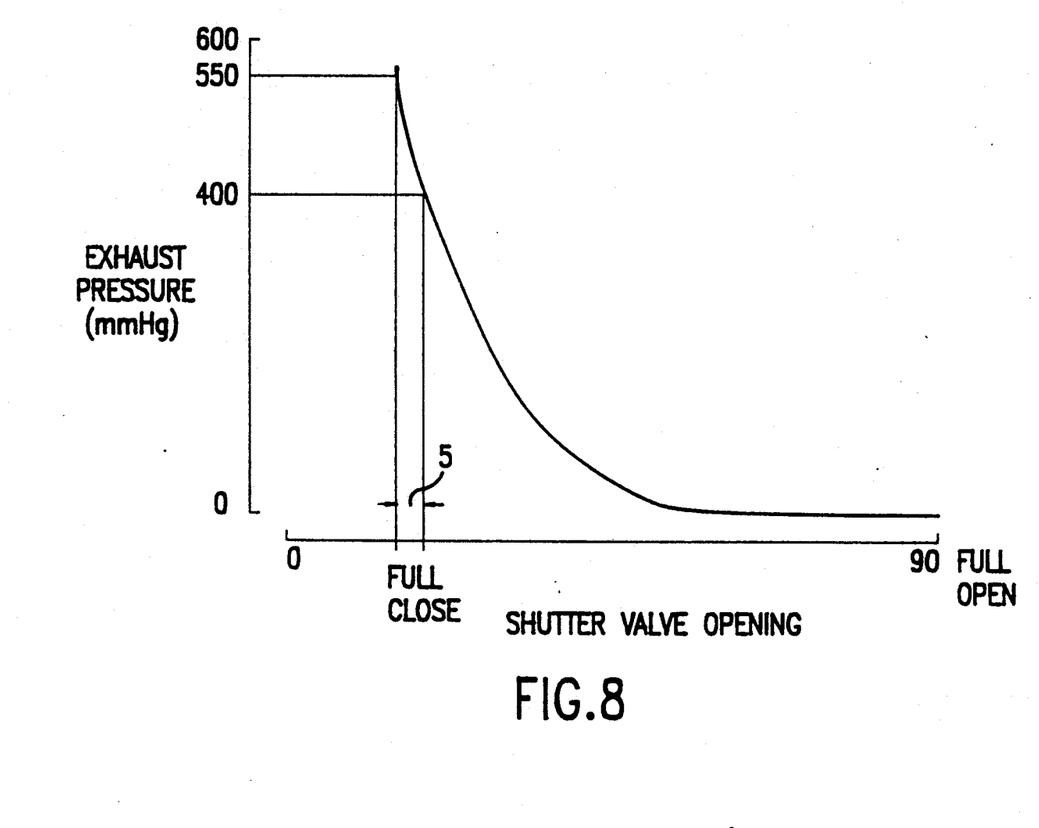
FIG. 8 is a diagram representing exhaust pressure with respect to shutter valve opening.

As was previously described, the shutter valve 40 is closed in the range I of engine operating conditions, in which the engine is not subjected to much of any load and operates at low engine speeds. The shutter valve 40, however, is fully opened when the vehicle starts. This is because the idle speed control valve 29 introduces an increased amount of intake air into the engine so as to compensate for an increase in exhaust load on the engine, which is caused by increasing exhaust flow resistance of exhaust gas (exhaust pressure) when the engine operating conditions are in the range I. Therefore, in order to avoid or suppress a drop in engine speed when the vehicle starts, the shutter valve 40 is opened so that flow resistance of exhaust gas when the vehicle is lowered. That is, an increase in work performed by the engine, due to an increase in exhaust flow resistance is utilized as a factor for increasing an engine torque necessary to start the vehicle. Furthermore, due to the effects of an increase in internal exhaust gas recirculation (EGR) resulting from an increase in exhaust flow resistance when the engine operates in the range I, the temperature inside the cylinder is raised. Consequently, fuel vaporization or atomization when the vehicle starts is promoted. This provides improved fuel combustibility, resulting in an increased engine output torque when the vehicle starts. Specifically, as shown in FIG. 8, a lower limit opening of shutter valve 40, when the engine operates in the range I, is established at 5 degrees from its fully closed position. At this lower limit opening, an exhaust pressure of approximately 400 mmHg is developed. This lower limit opening, which depends upon engine models, is determined by taking various factors, such as thermal characteristics and dimensions of the shutter valve, into consideration.

Shutter valve 40 is closed so that its opening is smaller before and during warming up of the engine. This is because closing of the shutter valve 40 causes the idle speed controller valve 29 to open wide in order to compensate for an increase in exhaust load on the engine, which is accompanied by an increase in the quantity of intake air and, hence, of fuel admitted into the engine. Consequently, gases are discharged at a high temperature from the engine 1. For this reason, the throttle valve is closed when the engine operates in the range I in an attempt to transmit as much heat from the exhaust gases to the cylinder head as possible so as to heat water circulating the cylinder head. This enhances warming up of the engine so as to develop stable combustion at an early time and lower harmful emissions in exhaust gases.

In order to improve starting of the vehicle, an ignition timing is changed from a retarded ignition timing when the engine operates in the region I to an advanced ignition timing after the vehicle starts. This is because retarding an ignition timing causes the idle speed control valve 29 to open widely so as to increase the quantity of intake air admitted into the engine and compensate for a reduction in engine output torque, thereby holding the engine at an idle speed. For this reason, when the vehicle starts, an ignition timing is advanced so that engine output torque is increased. For example, an ignition timing may be retarded approximately 0 to 10 degrees before a top dead center position in a compression stroke. This retardation is determined by considering responsiveness of the ignition control device and fuel combustibility when the ignition timing is retarded.

After warming up of the engine when it operates in the range I, the exhaust valve 11 opens at an angular position of 50 degrees before the bottom dead center (BDC) position and closes at an angular a position of 15 degrees after the top dead center (TDC) position so as to achieve the second valve overlap period T2. Otherwise, in engine operating ranges other than the range I, the exhaust valve 11 opens at an angular position of 50 degrees before the bottom dead center (BDC) position and closes at an angular position of 5 degrees after the top dead center (TDC) position so as to achieve the first valve overlap period T1. This is made in an attempt to promote internal exhaust gas recirculation (EGR) and enhance fuel vaporization by means of an increased quantity of residual gases. Intake valve 10 is specifically timed so as to open at an angular position of 5 degrees before the top dead center (TDC) position and close at an angular position of 50 degrees after the bottom dead center (BDC) position.

Figure 9:
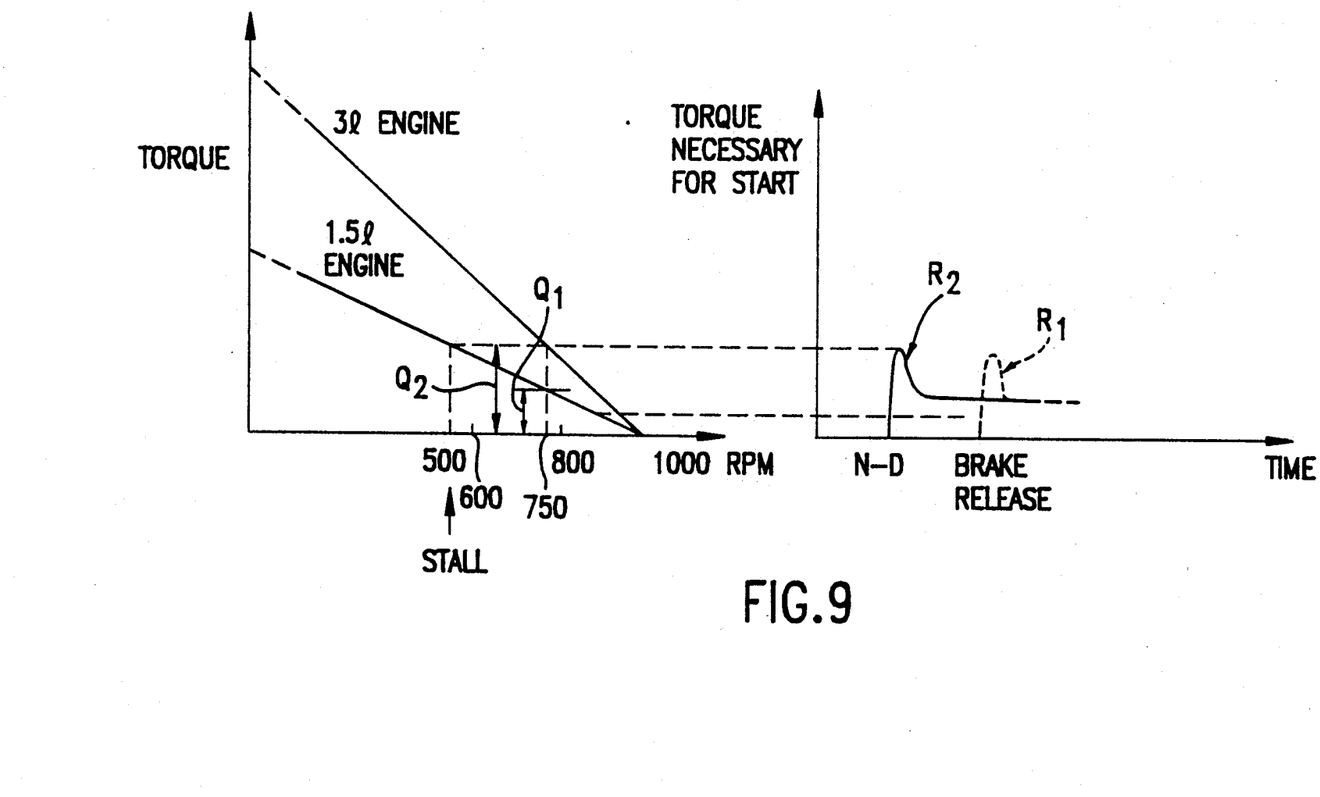
FIG. 9 is a diagram showing engine output torque.

As a specific example, a 1.5 liter engine which is controlled by an exhaust control system in accordance with a preferred embodiment of the present invention will be considered. The 1.5 liter engine achieves a high launching quality as compared to a 3.0 liter engine, which can launch or start movement of the vehicle at an engine speed of 750 r.p.m., 250 r.p.m. below 1,000 r.p.m. As shown in FIG. 9, if both the 1.5 liter engine and the 3.0 liter engine are kept at the same engine speeds, the speed of the 1.5 liter engine drops lower than that of the 3.0 liter engine for the same engine load. Therefore, the 1.5 liter engine needs twice as much intake air to launch the vehicle at an engine speed of 750 r.p.m. as the 3.0 liter engine needs, because the 1.5 liter engine has frictional losses which are twice as large as those of the 3.0 liter engine. That is, as shown in FIG. 9, the 1.5 liter engine must put out a torque $Q_2$ which is twice as large as a torque $Q_1$ provided by the 3.0 liter engine for the same load. In other words, since the 1.5 liter engine is subjected to a resistance which is constant in a speed range over 1,000 r.p.m., an intake air charging rate at which the engine outputs a torque necessary to operate at 1,000 r.p.m. causes engine stall at 500 r.p.m. This is apparent from the following formula:

$$\frac{Q1}{Q2} = (1000 - 500)/1000 = 0.5 \ (50\%)$$

However, if the speed of the engine is allowed to drop to 750 r.p.m. in order to prevent engine stalling, the 1.5 liter engine needs to output a torque of $Q_2$. That is, if the speed of the 1.5 liter engine is allowed to drop to 750 r.p.m. upon launching pf the vehicle, it is necessary for the engine to be charged with intake air at a rate at least 50% higher than the rate necessary to provide a speed of 1,000 r.p.m. when no throttling and no ignition timing retardation are conducted. This is apparent from the following:

$$\frac{Q1}{Q2} = 2 \times (1000 - 750)/1000 = 0.5 \ (50\%)$$

In FIG. 9, a line $R_2$ represents a torque necessary to launch the vehicle by releasing a brake after changing an automatic transmission to a drive range from a neutral range. The line $R_1$ represents a torque necessary to launch the vehicle by releasing the brake simultaneously with changing the automatic transmission to the drive range from the neutral range.

Figure 10:
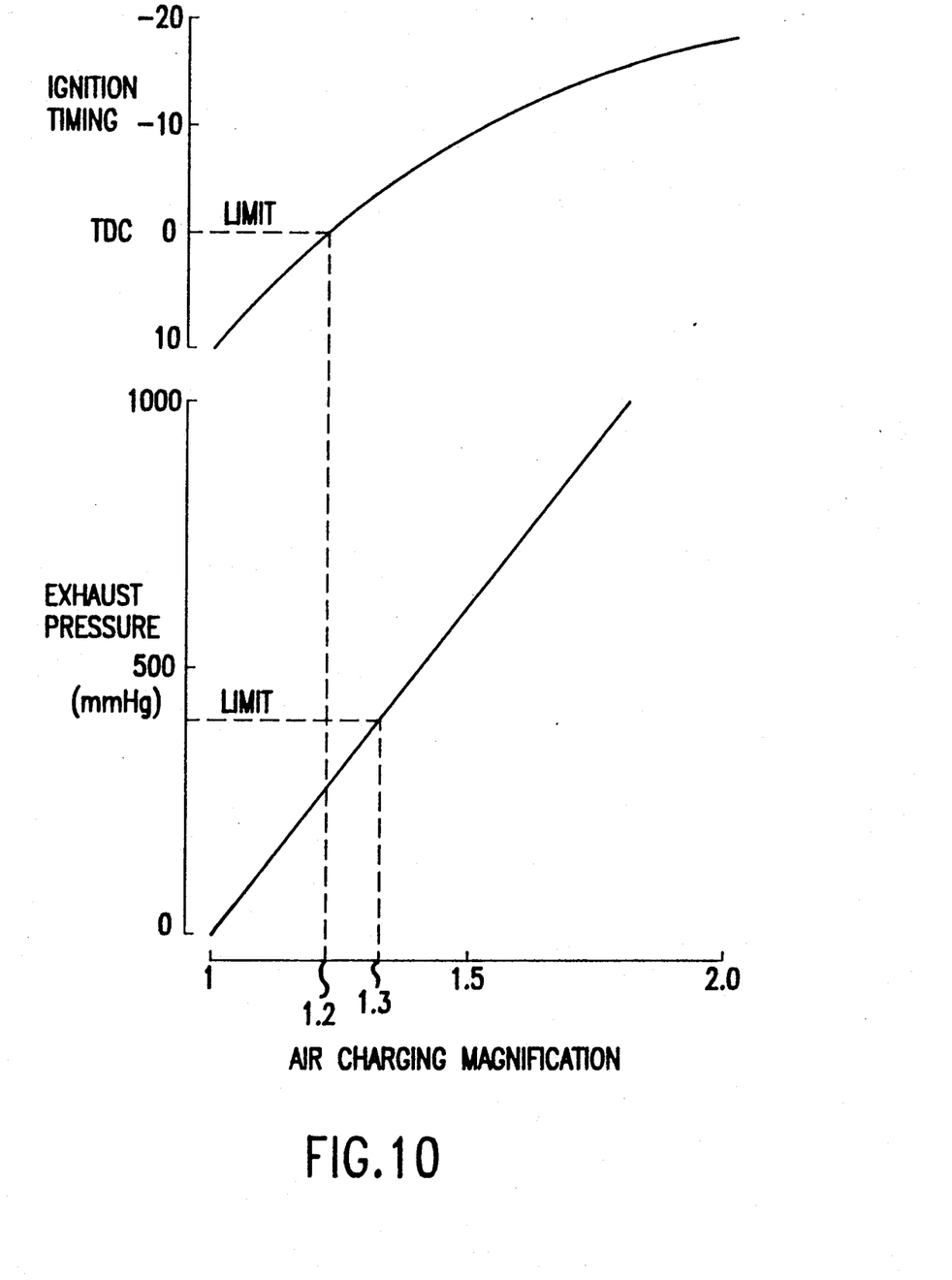
FIG. 10 is a diagram representing exhaust pressure with respect to air charging magnification.

Necessary intake air is provided by controlling shutter valve opening and ignition timing. The shutter valve 40 changes an air charging rate up to the limit at which an exhaust pressure of 400 mmHg is provided. The magnification of air charging rate (air charging magnification) corresponding to the exhaust pressure of 400 mmHg is 1.3 with respect to a standard air charging rate for a condition in which an exhaust pressure is 0 mmHg and an ignition timing is at an angle 10 degrees before the top dead center (TDC) position, as shown in FIG. 10. On the other hand, when an ignition timing is retarded 10 degrees, a magnification of an air charging rate (air charging magnification) corresponding to the retardation of 10 degrees is 1.2 with respect to the standard air charging rate, as shown in FIG. 10. Therefore, as a result of controlling both shutter valve opening and ignition timing, a total air charging rate magnification is 1.5 with respect to the standard air charging rate. Moreover, controlling a shutter valve opening accounts for a larger portion of managing air charging magnification than does controlling ignition timing. Controlling of the shutter valve opening so that it is larger also causes internal exhaust gas recirculation (EGR). Accordingly, the engine actually does not drop its speed to 750 r.p.m., and the vehicle is launched at an engine speed higher than 750 r.p.m. and even, for instance, higher than approximately 800 r.p.m.

Figure 11:
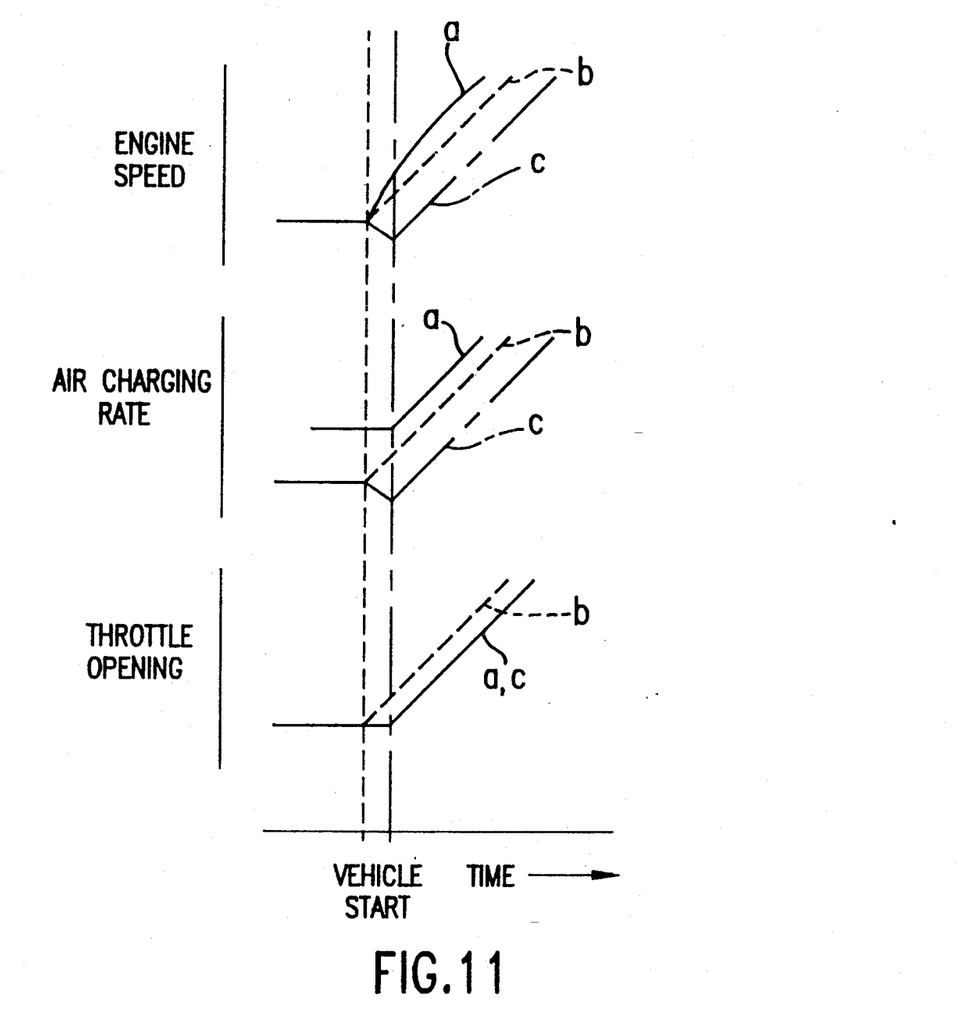
FIG. 11 is a diagram showing engine speed, air charging rate and throttle opening in comparisons of the exhaust system of this invention with ideal and conventional exhaust systems.
Figure 12:
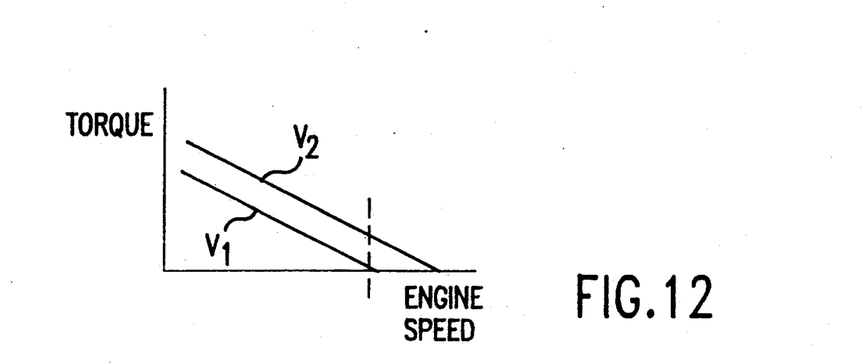
FIG. 12 is a diagram showing engine output torque with respect to engine speed.

Control factors, such as engine speed, air charging rate and throttle opening can possibly change due to time passage. In FIG. 11, respective changes are indicated by lines a, b and c for the exhaust control system of the present invention, an ideal exhaust control system and a conventional exhaust control system, respectively. The exhaust control system of the present invention enables the engine to increase its output and improve the launching quality of vehicle.

It is to be understood that although the invention has been described in detail with respect to a preferred embodiment thereof, various other embodiments and variants may occur to those skilled in the art. Any such, embodiments and variants which fall within the spirit and scope of the invention are intended to be covered by the following claims.

What is claimed is:

1. An. exhaust control system for purifying exhaust gases from an internal combustion engine through an exhaust passage, comprising:
   first catalytic means, disposed in said exhaust passage, for purifying exhaust gases;
   second catalytic means, smaller in capacity than said first catalytic means and disposed in said exhaust passage upstream from said first catalytic means, for purifying exhaust gases passed through said first catalytic means;
   shutter means, disposed in said exhaust passage upstream from said first catalytic means, for opening and closing said exhaust passage;
   temperature detecting means for detecting an engine cranking temperature during cranking of said engine; and
   control means for causing said shutter means to close said exhaust passage during a predetermined period from a start of cranking of said engine when said temperature detecting means detects an engine cranking temperature lower than a predetermined temperature and to open said exhaust passage after said predetermined period.

2. An exhaust control system as defined in claim 1, wherein said temperature detecting means comprises a temperature sensor associated with said second catalytic means, said second catalytic means being equipped with heating means for heating said second catalytic means.

3. An exhaust control system as defined in claim 1, and further comprising vehicle launching detecting means for detecting a launch of a vehicle on which said engine is mounted, said control means causing said shutter means to open said exhaust passage during said predetermined period when said vehicle launching detecting means detects a launch of said vehicle.

4. An exhaust control system as defined in claim 1, and further comprising idle speed control means for regulating an intake air rate at which intake air is introduced into said engine during engine idling, said control means further causing said idle speed control means to regulate said intake air rate so that said engine operates at a predetermined idle speed.

5. An exhaust control system as defined in claim 1, and further comprising an exhaust gas reservoir formed in said exhaust passage upstream from said shutter means for reserving exhaust gases therein.

6. An exhaust control system as defined in claim 1, and further comprising variable valve timing means for varying a valve timing at which an intake valve and an exhaust valve open and close, said control means causing said variable valve timing means to retard said valve timing so as to extend a valve overlap period for which said intake valve and said exhaust valve open simultaneously so that it is longer during said predetermined period than after said predetermined period when said temperature detecting means detects an engine cranking temperature lower than a predetermined temperature.

7. An exhaust control system as defined in claim 6, wherein said control means causes said variable valve timing means to advance a valve timing at which said exhaust valve opens so that it is earlier during said predetermined period than after said predetermined period and retard a valve timing at which said exhaust valve closes so that it is later during said predetermined period than after said predetermined period.

8. An exhaust control system as defined in claim 1, wherein said second catalytic means is equipped with heating means for heating said second catalytic means.

9. An exhaust control system as defined in claim 1, wherein each of said first and second catalytic means is a three-way catalytic converter.

10. An exhaust control system for purifying exhaust gases from an internal combustion engine passing through an exhaust passage, said internal combustion engine being equipped with idle speed control means for allowing intake air to bypass a throttle valve in an intake passage so as to regulate an engine speed during engine idling, said exhaust system comprising:

variable valve timing means for changing a valve overlap period during which an intake valve and an exhaust valve open simultaneously;

shutter means, disposed in said exhaust passage, for opening and closing said exhaust passage;

temperature detecting means for detecting an engine cranking temperature during cranking of said engine;

engine operating condition detecting means for detecting ranges of engine operating conditions of said engine; and control means for causing said variable valve timing means to vary a timing at which said intake valve and said exhaust valve open and close so as to extend said valve overlap period so that it is longer while said engine operating condition detecting means detects a specific range of engine operating conditions when said temperature detecting means detects an engine cranking temperature lower than a predetermined temperature than when said temperature detecting means detects an engine cranking temperature higher than said predetermined temperature, and causing said shutter means to close said exhaust passage so that it becomes smaller while said engine operating condition detecting means detects said specific range of engine operating conditions when said temperature detecting means detects an engine cranking temperature lower than said predetermined temperature than when said temperature detecting means detects an engine cranking temperature higher than said predetermined temperature.

11. An exhaust control system as defined in claim 10, wherein said control means causes said variable valve timing means to advance a valve timing at which said exhaust valve opens so as to make said valve overlap period longer.

12. An exhaust control system as defined in claim 10, wherein said engine is subjected to low engine load and operates at low engine speeds in said specific range of engine operating conditions.

13. An exhaust control system as defined in claim 10, wherein said engine is cooled by water.

14. An exhaust control system as defined in claim 10, and further comprising catalytic means, disposed in said exhaust passage upstream from said shutter means, for purifying exhaust gases

15. An exhaust control system for purifying exhaust gases from an internal combustion engine passing through an exhaust passage, said internal combustion engine being equipped with idle speed control means for allowing intake air to bypass a throttle valve in an intake passage so as to regulate an engine speed during engine idling, said exhaust system comprising:

vehicle launching detecting means for detecting launching of a vehicle on which said engine is mounted;

engine operating condition detecting means for detecting ranges of engine operating conditions of said engine;

exhaust resistance regulating means, disposed in said exhaust passage, for regulating exhaust flow resistance of exhaust gases passing though said exhaust passage; and control means for causing said exhaust resistance regulating means to increase said exhaust flow resistance while said engine condition detecting means detects a specific range of engine operating conditions and to reduce said exhaust flow resistance after said vehicle launching detecting means detects a launch of said vehicle.

16. An exhaust control system as defined in claim 15, and further comprising catalytic means, disposed in said exhaust passage upstream from said exhaust resistance regulating means, for purifying exhaust gases.

17. An exhaust control system as defined in claim 15, and further comprising temperature detecting means for detecting an engine cranking temperature during cranking of said engine, said control means causing said exhaust resistance regulating means to increase said exhaust flow resistance so that it is higher when said temperature detecting means detects an engine cranking temperature lower than a predetermined temperature than when said temperature detecting means detects an engine cranking temperature higher than a predetermined temperature while said engine operating condition detecting means detects a specific range of engine operating conditions.

18. An exhaust control system as defined in claim 15, wherein said engine is subjected to engine load and operates at low engine speeds in said specific range of engine operating conditions.

19. An exhaust control system as defined in claim 15, wherein said engine is cooled by water.

20. An exhaust control system as defined in claim 17, and further comprising variable valve timing means for varying a valve timing at which an intake valve and an exhaust valve open and close, said control means causing said variable valve timing means to retard said valve timing so as to extend a valve overlap period during which said intake valve and said exhaust valve open simultaneously so that it is longer during a predetermined period than after said predetermined period when said temperature detecting means detects an engine cranking temperature lower than a predetermined temperature.

21. An exhaust control system as defined in claim 20, wherein said control means causes said variable valve timing means to advance a valve timing at which said exhaust valve opens so that it is earlier during said predetermined period than after said predetermined period and retard a valve timing at which said exhaust valve closes so that it is later during said predetermined period than after said predetermined period.

* * * * *